(12) United States Patent
Bruneau et al.

(10) Patent No.: US 12,705,322 B2
(45) Date of Patent: Aug. 11, 2026

(54) METHOD, DEVICE AND SYSTEM FOR GENERATING PASSWORDS

(71) Applicant: ORANGE, Issy-les-Moulineaux (FR)

(72) Inventors: Garry Bruneau, Chatillon Cedex (FR); Philippe Quesson, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 302 days.

(21) Appl. No.: 18/254,706

(22) PCT Filed: Nov. 23, 2021

(86) PCT No.: PCT/FR2021/052071
§ 371 (c)(1),
(2) Date: May 26, 2023

(87) PCT Pub. No.: WO2022/112705
PCT Pub. Date: Jun. 2, 2022

(65) Prior Publication Data

US 2023/0418914 A1 Dec. 28, 2023

(30) Foreign Application Priority Data

Nov. 27, 2020 (FR) ...................................... 2012261

(51) Int. Cl.
*G06F 21/31* (2013.01)

(52) U.S. Cl.
CPC .................................... *G06F 21/31* (2013.01)

(58) Field of Classification Search
None
See application file for complete search history.

(56) References Cited

U.S. PATENT DOCUMENTS 6,687,836 B1 * 2/2004 Butler ..................... G06F 21/46 726/19
8,312,287 B2 * 11/2012 Lim ........................ G06F 21/46 713/184

(Continued)

FOREIGN PATENT DOCUMENTS

| | | | | |
|---|---|---|---|---|
| CN | 106372492 A | 2/2017 | | |
| FR | 3028336 A1 | 5/2016 | | |
| WO | WO-2007041825 A1 * | 4/2007 | ............ | G06F 21/46 |

OTHER PUBLICATIONS

Abdellaoui A, Khamlichi Yi, Chaoui H. A novel strong password generator for improving cloud authentication. Procedia Computer Science. Jan. 1, 2016;85:293-300. (Year: 2016).*

(Continued)

*Primary Examiner* — James R Turchen
(74) *Attorney, Agent, or Firm* — David D. Brush; Westman, Champlin & Koehler, P.A.

(57) ABSTRACT

A method and a device for generating a password for access to a service. The method includes the following steps on a password generating device connected to a user terminal: obtaining a first item of data representative of at least one symbol; depending on the obtained first item of data, obtaining at least one second item of data having at least two symbols for a symbol of the first item of data; generating a third item of data, referred to as the password, from the at least one second item of data; and transmitting the password to the terminal.

12 Claims, 2 Drawing Sheets

(56) References Cited

U.S. PATENT DOCUMENTS

| | | | | |
|---|---|---|---|---|
| 8,520,848 | B1 * | 8/2013 | Liu | H04L 63/083 380/52 |
| 10,733,283 | B1 | 8/2020 | Osborn et al. | |
| 11,657,142 | B2 * | 5/2023 | Krishna | G06F 21/46 726/6 |
| 2011/0225638 | A1 * | 9/2011 | Nahari | H04L 63/083 726/7 |
| 2015/0067760 | A1 * | 3/2015 | Waltermann | G06F 21/6218 726/1 |
| 2015/0128234 | A1 * | 5/2015 | Xavier | H04L 63/0861 726/6 |
| 2017/0091441 | A1 * | 3/2017 | Moore, Jr. | H04L 9/3226 |
| 2017/0155635 | A1 * | 6/2017 | Venigalla | H04L 63/0861 |
| 2017/0169211 | A1 * | 6/2017 | Gao | H04L 63/083 |
| 2017/0193216 | A1 * | 7/2017 | Lucas | H04L 63/083 |
| 2017/0200003 | A1 * | 7/2017 | Zaver | H04L 9/0656 |
| 2017/0295160 | A1 * | 10/2017 | Zaifman | G06F 21/46 |
| 2018/0300473 | A1 * | 10/2018 | O'Dell | G06F 21/46 |
| 2021/0026943 | A1 * | 1/2021 | Tiller | G06F 21/62 |
| 2022/0366033 | A1 * | 11/2022 | Krishna | G06F 21/46 |

OTHER PUBLICATIONS

English translation of the Written Opinion of the International Searching Authority dated May 30, 2023, for corresponding International Application No. PCT/FR2021/052071, filed Nov. 23, 2021.

International Search Report dated Jan. 25, 2022 for corresponding International Application No. PCT/FR2021/052071, filed Nov. 23, 2021.

Written Opinion of the International Searching Authority dated Jan. 25, 2022 for corresponding International Application No. PCT/FR2021/052071, filed Nov. 23, 2021.

* cited by examiner

METHOD, DEVICE AND SYSTEM FOR GENERATING PASSWORDS

CROSS-REFERENCE TO RELATED APPLICATIONS

This Application is a Section 371 National Stage Application of International Application No. PCT/FR2021/052071, filed Nov. 23, 2021, which is incorporated by reference in its entirety and published as WO 2022/112705 A1 on Jun. 2, 2022, not in English.

FIELD OF THE INVENTION

The invention relates to the field of communications security.

The invention is applicable to any terminal handling secure passwords for protecting the access to a hardware or software resource.

PRIOR ART

In a known manner, a password is an authenticator allowing a user to access a certain number of hardware and/or software resources of a computer, of a server, of an assembly of network-connected computers, etc.

Several strategies may be used for generating passwords exhibiting a certain level of robustness, and hence offering a higher or lower level of security.

Most of these strategies are maladapted for a human user, because it is difficult to generate a password that is readily memorized and which nevertheless has a certain level of security, in other words that guarantees the robustness of the password used, i.e. greatly reduces its vulnerability to pirate attacks (hackers) aimed at stealing it. Indeed, the robustness of a password depends on its length (the number of words, or symbols, from a given dictionary) and on the total number of words used from the dictionary. The security increases with the number of symbols composing the password and the wealth of the chosen dictionary. However, it is not easy for a human user to memorize a long series of symbols, whether they be letters, numbers, special characters, etc.

Moreover, since the attacks are becoming more sophisticated over time, the passwords must be even longer in order to resist them. The user very often balks at the use of such long and complex passwords, difficult to memorize, manipulate and potentially share if it is the password for accessing a shared service, such as for example a Web service, access to a bank account, etc. In many cases, he/she is happy to use a very simple password that is very easy to memorize ("1234", "Garry", etc.) but also to hack.

Today, solutions exist for rendering such a password secure. Notably, there exist cryptographic authentication systems, for which the simple connection of a smartcard allows the terminal of the user to be authenticated. However, in the case of loss of the card, anybody can authenticate themselves in place of the user.

In order to solve this problem, this type of card may be associated with a security code. However, this code is unique and does not therefore allow authentication for various applications and/or services requiring different passwords.

There also exist systems of password safes, such as for example the YubiKey© authentication device, manufactured and marketed by the Yubico company, allowing users to authenticate themselves in a secure manner with their accounts by generating a single-use password or by storing static passwords for the sites that do not support single-use passwords. Such a device however requires the installation of a software or hardware component on the PC (of the plug-in type), and also on the remote server hosting the service. Moreover, the data are stored locally on the PC.

There accordingly exists a need to offer the user the possibility of using very simple passwords while at the same time ensuring a high security for them on various sites, irrespective of the terminal that they are using.

DESCRIPTION OF THE INVENTION

The invention provides an improvement on the prior art.

For this purpose, it provides a method for generating a password for accessing a service, said method comprising the following steps on a password generating device connected to a terminal of a user:

- obtain a first datum representative of at least one symbol;
- as a function of the first datum obtained, obtain at least one second datum comprising at least two symbols for one symbol of the first datum;
- generation of a third datum, called password, from said at least one second datum;
- transmission of said password to the terminal.

The term "symbol" is understood to mean any given symbol belonging to a dictionary, for example a character. Here, dictionary is understood to mean any given source of symbols (alphabet, syllables, letters, numbers, series of numbers and letters, special characters, etc.). For example, as source of the first datum, a dictionary composed of the 9 digits from 0 to 9 is used and, as source of the second datum, a dictionary composed of all the letters and combinations of letters of the Latin alphabet is used. The password is composed, in this case, of words (series of letters) extracted for example randomly from this dictionary.

Of course, many variants may be envisioned without straying from the scope of the invention: use of numbers, special characters, etc.

Advantageously, according to the invention, when the user enters at least one symbol, for example a character corresponding to a number between 0 and 9, into a human-machine interface of the device, another chain of symbols, for example of alphanumeric characters (such as 7b2a385c), is generated by the device and concatenated to the password. Since this chain of symbols is longer and more complex than the simple character entered, the password which results from this is more robust. Indeed, it is not easy for a human user to memorize a long series of symbols, whether this be combinations of letters, of numbers, etc. On the other hand, it is very simple for them to memorize the first datum (for example 1234) as a series of digits to be input on the keyboard of the device, or to be pronounced to a vocal interface, etc. For each digit input by the user and obtained by the generation program, a longer chain of characters is generated and potentially concatenated to the existing chain. Thus, a long and complex password is generated from a simple code such as a series of digits. It will be noted that the password may just as easily be generated on the fly, in other words each symbol input on the device leads to the generation of a part of the password, or be generated after all the symbols of the first datum have been input into the terminal.

According to one particular embodiment of the invention, in the method such as described hereinabove, the transmission step is preceded by a step for verifying the first datum obtained.

Advantageously, according to this embodiment, the first datum, composed of one or more symbols input into an interface of the device, is verified before being transmitted to the terminal.

The verification may apply to various elements: number of first symbols entered, for example if the method is expecting a code of the PIN type composed of 4 digits, certain first data may be excluded from the validation (for example "587" is too short, a code "0000" or "1234" may be forbidden since too easy to guess, etc.).

According to one particular embodiment of the invention, in the method such as described hereinabove, the transmission step is preceded by a step for verifying the password generated.

Advantageously, according to this embodiment, the final password is verified before being transmitted to the terminal. The verification may be applied to various elements: number of symbols generated, length of the password generated, complexity of the password generated, etc. A standard verification method may notably be envisioned, such as the presence of an upper case and/or lower case letter, number, special character, etc. in the password, or the compliance with a minimum length. According to another example, the level of security of the password, or the compliance with the minimum entropy threshold, may be verified each time a new acquisition of a symbol/character adds an additional chain to the password. An entropy is defined most generally, in the field of information and communications, as a mathematical function which corresponds to the quantity of information contained or delivered in a message (the password in this particular case) by an information source, in this context a dictionary of characters. From the point of view of a receiver, the more the source generates different symbols with an equal probability, the higher the entropy. It may thus be indicated to the user, as soon as the level of entropy, and hence of robustness, of the password is judged to be sufficient, that they may stop inputting characters on the keyboard of the device.

According to one particular embodiment of the invention, in the method such as described hereinabove, an unlocking step precedes the acquisition of the first symbol of the first datum.

Advantageously, according to this embodiment, an additional security is associated with the generation of the password. The unlocking step indeed allows it to be ensured that the user of the generation device really is the one expected (e.g. its owner). It may be carried out following the acquisition of a biometric datum of the user (fingerprint, eye scan, predefined movement, vocal sequence, etc.)

According to one particular embodiment of the invention, the method such as described hereinabove furthermore comprises a step for initializing the device, comprising a substep for recording a series of at least two symbols of the second datum in association with at least one symbol of the first datum.

Advantageously, according to this embodiment, the device is pre-configured for automatically generating passwords. For example, if the device disposes of a keyboard with keys numbered from 0 to 9, a series of alphanumeric symbols may be associated with each of these numbers, stored in the memory of the device. Subsequently, when the user presses a key of the device, the corresponding series of symbols is extracted from the memory and automatically concatenated to the password being prepared.

In a correlated manner, the invention also provides a device for generating a password, comprising at least a transmission module, a memory and a processor configured for:

- obtaining a first datum representative of at least one symbol;
- as a function of the datum obtained, obtaining a second datum comprising at least two symbols for one symbol of the first datum;
- generating a third datum, called password, from said at least one second datum;
- transmitting said password via the transmission module.

The invention also relates to such a device furthermore comprising a human-machine interface for the acquisition of said at least one first datum.

The invention also relates to such a device in which the human-machine interface is a keyboard.

The invention also relates to such a device in which the transmission module is an interface of the serial type.

The invention also relates to such a device in which the transmission module is an interface of the radio type.

The invention also relates to a system comprising:

- a device for generating a password such as previously defined,
- a terminal connected to the password generating device via its transmission module, configured in such a manner as to transmit the password generated by the device to the terminal when the password is valid.

The invention also relates to a computer program comprising instructions for the implementation of the method hereinabove according to any one of the particular embodiments previously described, when said program is executed by a processor. The method may be implemented in various ways, notably in wired form or in software form. This program may use any given programming language, and may take the form of source code, object code, or of code intermediate between source code and object code, such as in a partially compiled form, or in any other desired form.

The invention is also aimed at a recording medium or information medium readable by a computer and comprising instructions of a computer program such as mentioned hereinabove. The aforementioned recording media may be any given entity or device capable of storing the program. For example, the medium may comprise a storage means, such as a ROM, for example a CD-ROM or a microelectronic circuit ROM, or else a magnetic recording means, for example a hard disk. Furthermore, the recording media may correspond to a transmissible medium such as an electrical or optical signal, which may be carried via an electrical or optical cable, by radio or by other means. The programs according to the invention may in particular be uploaded onto a network of the Internet type.

Alternatively, the recording media may correspond to an integrated circuit into which the program is incorporated, the circuit being designed to execute or to be used in the execution of the method in question.

This device and this computer program have features and advantages analogous to those previously described in relation with the method for generating a password.

LIST OF THE FIGURES

Other features and advantages of the invention will become more clearly apparent upon reading the following description of particular embodiments, presented by way of simple illustrative and non-limiting examples, and from the appended drawings, amongst which:

DESCRIPTION OF ONE EMBODIMENT OF THE INVENTION

General Principle of the Invention

The general principle of the invention consists in connecting to a terminal (computer/tablet/smartphone/gateway) for accessing a service (Web service, payment service, etc.) a very simple device recognized as an access peripheral, for example of the keyboard type.

This very simple device comprises a limited number of keys (e.g. from 0 to 9). The user may associate a random number of symbols or characters with each key. Each time a key is pressed it generates a series of numbers and/or letters and/or symbols of any given alphabet to be transmitted to the terminal to which it is connected.

It is thus possible to generate a password that is very difficult to hack with a minimum number of digits or letters to be memorized by the user.

Particular Embodiments of the Invention

Figure 1:
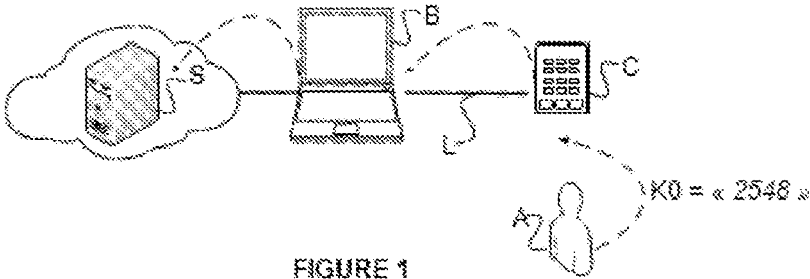
FIG. 1 illustrates one example of implementation environment of the invention according to one particular embodiment.

FIG. 1 shows the context of one embodiment of the invention according to which a user (A) has to enter a password for authentication to a remote site S via a terminal B, for example a payment site, or a 'hotspot', etc. According to this example, the password is intended for an application being run on a WEB server to which the terminal B is connected via an Internet network. Of course, other scenarios may be envisioned: the network may be of any nature (radiomobile, internet, cellular, etc.); the service targeted may be localized on the terminal itself, for example if this is a server, a payment terminal, a home network gateway, etc.

The user disposes of a device (C) connected to the terminal via a communications link (L). The connection may be of any given type, wired or wireless. According to one embodiment, it is of the USB (Universal Serial Bus) type for a serial connection with the terminal B, which disposes of an interface of the same type as the device (USB).

The device C is, according to this example, a very simple device recognized as a USB keyboard, which allows numerical data of the digit type to be input and for it to be converted, by association of each digit with a series of longer symbols, into a complex password and for it to be transmitted to the terminal B. For example, the user inputs into this device, by means of his/her keyboard, a code of the 'PIN code' type, in other words an ordered series of 4 digits. Each time that he/she inputs a digit, a series of symbols is obtained from the memory of the device, and this series is concatenated to the password in the process of being generated. The password is finalized after inputting the fourth digit. Optionally, the code and/or the password may be displayed for verification on a screen of the terminal, if it has one, and the input is validated by validation keys of the device, triggering a transmission to the terminal B according to the USB serial protocol. In such a context, the device may not have an internal power supply. This is because, conventionally, the USB interface transports power to the microcontroller of the device C. The microcontroller being correctly powered, the communication becomes possible between the device C and the terminal B. Advantageously, such a very simple device offers the additional advantage of being very resistant to attacks and hacking.

According to another example, not shown, the device C is a smartphone hosting an application for generating passwords. On the screen of the smartphone, the user may input data, for example numerical data, which is transformed into a password by a software module (for example an applet) or hardware module (for example a USB flash drive) before being transmitted to the terminal B. For example, the user inputs into the smartphone, by means of an emulated keyboard, a code of the "PIN code" type. Optionally, the code and/or the password may be displayed for verification on the screen of the terminal or of the smartphone, and the input is validated by validation keys of the smartphone, triggering a transmission to the terminal B according to a radio protocol (for example Bluetooth).

Of course, in both cases, many variants may be envisioned without straying from the context of the invention:

- other communications interfaces and protocols, wired or wireless, available to those skilled in the art could replace the USB or Bluetooth protocols mentioned for the communication with the terminal: for example a serial interface of the RS232 type, or another type of serial interface, or else a parallel interface, or else a radio interface of the Wi-Fi type or light interface of the Li-Fi type, etc. Nevertheless, since another type of connection is not necessarily able to supply the microcontroller of the device with the power that it needs, it will additionally be necessary to provide a power supply means, for example a current generator, within the device.
- other human-machine interfaces may be used: vocal interface (the user pronounces a series of numbers or letters), movement detection interface (the user draws on the screen a pattern corresponding to a series of symbols of the first datum), etc.

Figure 2:
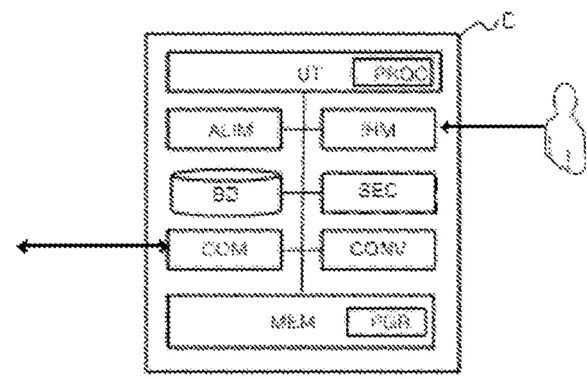
FIG. 2 illustrates an architecture of a password generating device according to one embodiment of the invention.

FIG. 2 illustrates an architecture of the device C according to one embodiment.

According to this embodiment, the device C has the conventional architecture of a keyboard, and notably comprises a memory MEM, a processing unit UT, equipped for example with a processor PROC and controlled by the computer program PGR stored in memory MEM. Upon initialization, the code instructions of the computer program PGR are for example loaded into a memory before being executed by the processor PROC. The processor PROC of the processing unit UT notably implements the steps of the method for generating a password according to any one of particular embodiments described in relation with FIGS. 1 and 3, according to the instructions of the computer program PGR: initialization of the device, notably with the aim of it being recognized as a keyboard of the USB type according to one embodiment of the invention, generation of the passwords based on a simple code, verification of the code or of the passwords, verification of the user, etc.

According to other embodiments or their variants, and without straying from the scope of the invention, the device furthermore comprises:

- an input-output module (COM) for the communications with the terminal B (serial USB link, or NFC module, or Wi-Fi, etc.);

- a power supply module (this may be a power supply on the device, or power received via a link of the USB type for example);
- a data base (BD) notably storing the sequences of symbols (of the second datum) associated with the entries of the user (entry of the symbols of the first datum); for example, a preferably random sequence of alphanumeric symbols is associated with each digit from 1 to 9; according to the embodiments described, the database is located in the memory MEM of the device or of an associated device;
- a conversion module CONV for converting the entries of the user (first datum) into a password (third datum) to be transmitted to the terminal, resulting from the concatenation of the second data;
- a module IHM for the communication with the user (for example a module for controlling the keyboard, designed to capture the entries of the user on the keys of the keyboard, or a microphone designed to capture audio data, etc.);
- optionally, a module SEC for protecting the access to the device (recognition of fingerprint, face, voice, etc. of the user);
- optionally, a module GENE (not shown) for generating keys (K1) which may associate, during the initialization of the device, at least one longer and preferably random chain of symbols with a symbol. This module may be used at the first use of the device (initialization) or during a re-initialization of the device (reset resulting in a loss of the existing passwords). Optionally, this module may associate different chains with the same symbol according to the order, the recurrence, etc. of the symbols. It may for example use a random number generator (of the GUID or UUID type, etc.);
- optionally, a module IMP (not shown) for import/export of the data to a new device, in the case where the user changes device and wishes to recover the recorded associations.

According to another embodiment, not shown, the device is partially included in a terminal of the smartphone type, which already possesses a keyboard and can support the conversion algorithm. In this case, the device may be a simple flash drive to be connected to the smartphone, comprising the module BD for associating chains of symbols with a character/symbol.

According to another embodiment, not shown, the device is entirely included in a terminal of the smartphone type equipped with a specific program (preferably secured, such as for example an applet running in the SIM card associated with the smartphone) designed to manage all the aforementioned modules, notably the keyboard (IHM) via an emulation on the screen of the smartphone, the conversion algorithm (CONV) and the conversion tables (BD) in memory, and the communication (COM) with the terminal, for example using the Bluetooth module of the smartphone. Advantageously, in this case, the smartphone is equipped with the hardware and software means which allow it to be recognized as a keyboard (a keyboard emulation module).

Figure 3:
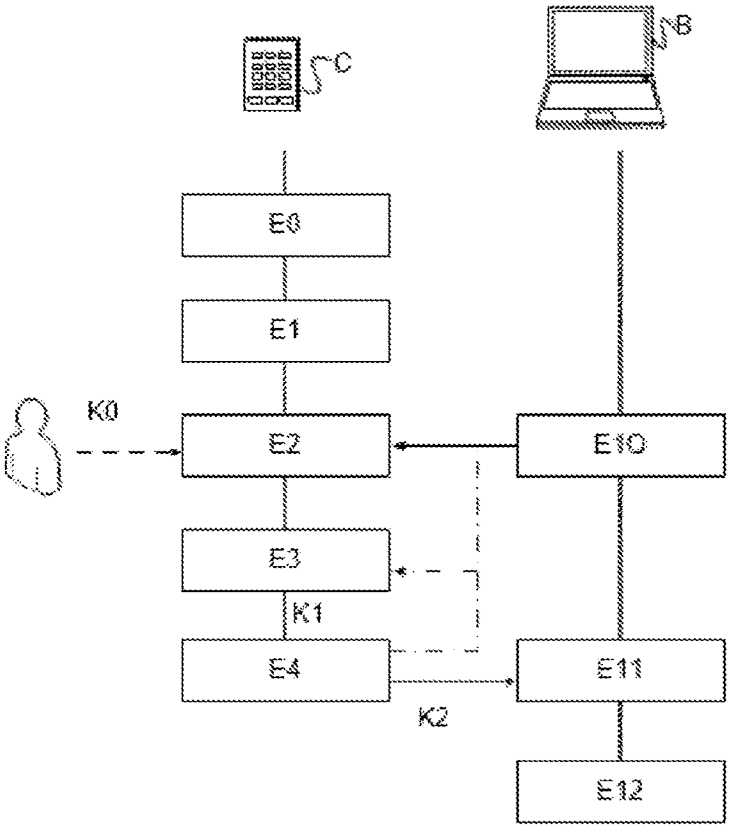
FIG. 3 illustrates steps of the method for generating passwords according to one embodiment of the invention.

FIG. 3 illustrates steps of the method for generating the password according to one embodiment of the invention.

During a step E0, the user carries out a certain number of initializations on his/her device: he/she optionally unlocks the device (via a fingerprint, a code, etc.), then configures the human-machine interface, according to this embodiment the keys of the keyboard; according to one example, he/she may input themselves the combinations associated with the keys either directly on the keyboard of the device (for example the key 1 will be associated with the chain 273293857) or on an interface of the user terminal which is connected to the device, which allows a more extensive dictionary of symbols to be made available (for example the key 1 will be associated with the chain 32414c279f52, etc.). According to another example, the generation module GENE uses a random data or random number generator to be associated with each of the keys (for example 1↔b7b2a385c; 2↔e79av; 3↔9099; 4↔32414c279f52, etc.). In any case, the associations between the keys (generators of the first data) and the sequences (or second data) are stored in memory by the device. Preferably, during this step, the device is connected to a terminal which offers it a configuration interface.

During a later step E1, when the user wishes to access a service (local or remote) protected by a password, he/she connects their device to the access terminal B, for example via a USB link. During the connection, a dialogue is established between the terminal and the device, according to a conventional USB recognition procedure, at the outcome of which the device is recognized as a USB keyboard. Such a dialogue, during which the device describes itself as an HID (Human Interface Device) of the keyboard type, is well known by those skilled in the art. The user optionally unlocks the device, the access to the keys being protected by reading a fingerprint in order to ensure that anyone finding the device cannot see the codes generated by the flash drive (which would tend to decrease the protection), or password.

According to one variant, the connection of the device to the terminal causes a virtual keyboard to appear on the screen of the terminal, which allows the number of possibilities to be increased and access to an alphanumeric code (first datum) to be obtained (for example a simplified code linked with the user or the service required, such as for example 'garry' or "BOX").

According to another variant, the keys of the device may be replaced by another mechanism for interfacing with the user, for example a microphone coupled to a module for voice recognition and/or identification of the speaker.

During a step E10, the terminal B requests a password, for example that required for the access to the remote site S shown in FIG. 1.

During a step E2, the user enters at least one symbol of the code for connection to the service, in other words a first datum (9, or B, etc.) or the entirety of the expected first data (9-4-7-1 or B.O.X or Y.A.H.O.O, etc.) This code is denoted K0.

During a step E3, a second datum is generated by the device for the symbol or symbols that have just been entered, using the storage in memory that has been carried out at the step E0. This second datum may correspond to all or part of the password (denoted K2) depending on whether the connection code has been entered entirely or otherwise. Indeed:

- according to a first embodiment, the second datum, K1, is generated each time that the user enters a symbol (by pressing a key) and the second datum is concatenated in a buffer for composition of the password; in this case, the steps E2 and E3 are carried out as many times as is necessary in order to obtain the code composed of the first data (K0) and hence for the generation of the complete password. This is illustrated by the rising dashed arrow in the figure;
- according to one variant, the second datum is generated each time that the user enters a symbol (key) and the second datum is transmitted with the flow to the terminal; in this case, it is not necessary to use an intermediate concatenation buffer and the steps E2 to E4 are carried out as many times as is necessary to obtain the complete code (and hence the password). This is illustrated by the rising dashed arrow in the figure;

according to another variant, the second datum is generated only when the user has input his entire code, or set of first data. In this case, the complete password is generated in one go at the step E3; it is not necessary to use an intermediate concatenation buffer.

During a step E4, the password is transmitted to the terminal. It will be noted that, depending on the option previously chosen, it may be transmitted with the flow as the second data is generated, or at the end when the password is completely formed.

During a step E11, the terminal receives the password K2 and verifies it. If the password is not valid, the method may return to the step E10/E2. Otherwise, the user accesses the service at the step E12. The device may be disconnected from the terminal.

It goes without saying that the embodiment which has been described hereinabove has been presented purely by way of non-limiting example, and that numerous modifications may easily be made by those skilled in the art without however straying from the scope of the invention.

The invention claimed is:

1. A method for generating a password for accessing a service, said method being performed on a password generating device connected to a terminal of a user and comprising:

obtaining a first datum corresponding to an entire input code representative of a plurality of symbols entered into the password generating device by the user;

as a function of the first datum obtained, obtaining at least one second datum comprising at least two symbols for one symbol of the first datum, comprising generating a respective second datum for each of the plurality of symbols, and at least one of the second datums is dependent upon an order of the plurality of symbols or a recurrence of a symbol of the plurality of symbols;

generating a third datum, called the password, from said at least one second datum, wherein the obtaining said at least one second datum and the generating the third datum are performed such that the password is different than at least one other password generated by the same password generating device for the same input code; and transmitting said password to the terminal.

2. The method as claimed in claim 1, further comprising, prior to the transmitting, verifying the first datum obtained.

3. The method as claimed in claim 1, further comprising, prior to the transmitting, verifying the password generated.

4. The method as claimed in claim 1, further comprising performing an unlocking step prior to obtaining a first symbol of the first datum.

5. The method as claimed in claim 1, furthermore comprising initializing the device, comprising recording a series of at least two symbols of the second datum in association with at least one symbol of the first datum.

6. A device for generating a password, comprising:

a transmitter, a memory; and a processor which is configured to:

obtain a first datum corresponding to an entire input code representative of a plurality of symbols entered into the device by a user;

as a function of the datum obtained, obtain at least one second datum comprising at least two symbols for one symbol of the first datum, comprising generating a respective second datum for each of the plurality of symbols, and at least one of the second datums is dependent upon an order of the plurality of symbols or a recurrence of a symbol of the plurality of symbols;

generate a third datum, called the password, from said at least one second datum, wherein the obtaining said at least one second datum and the generating the third datum are performed such that the password is different than at least one other password generated by the same password generating device for the same input code; and transmit said password via the transmission module.

7. The device for generating a password as claimed in claim 6, furthermore comprising a human-machine interface for obtaining said at least one first datum.

8. The device for generating a password as claimed in claim 7, in which the human-machine interface is a keyboard.

9. The device for generating a password as claimed in claim 6, in which the transmitter comprises a serial interface.

10. The device for generating a password as claimed in claim 6, in which the transmitter comprises a radio interface.

11. A non-transitory computer readable medium comprising code instructions stored thereon which, when the program is executed by a processor of a password generating device, carries out a method for generating a password for accessing a service, said method comprising:

obtaining a first datum corresponding to an entire input code representative of a plurality of symbols entered into the password generating device by a user;

as a function of the first datum obtained, obtaining at least one second datum comprising at least two symbols for one symbol of the first datum, comprising generating a respective second datum for each of the plurality of symbols, and at least one of the second datums is dependent upon an order of the plurality of symbols or a recurrence of a symbol of the plurality of symbols;

generating a third datum, called the password, from said at least one second datum, wherein the obtaining said at least one second datum and the generating the third datum are performed such that the password is different than at least one other password generated by the same password generating device for the same input code; and transmitting said password to a terminal of the user.

12. The method as claimed in claim 1, further comprising:

prior to obtaining the first datum, storing in a database, for each of a plurality of symbols that can be entered by the user, an association of the symbol with at least one respective second datum, each respective second datum comprising at least two symbols, wherein obtaining the at least one second datum comprises, for each of the at least one plurality of symbols entered by the user, obtaining one of the at least one respective second datum that is associated with the symbol entered by the user.

* * * * *